United States Patent
Takagi et al.

(10) Patent No.: US 7,580,246 B2
(45) Date of Patent: Aug. 25, 2009

(54) SOLID ELECTROLYTIC CAPACITOR AND METHOD FOR MANUFACTURING SAME

(75) Inventors: Seiji Takagi, Osaka (JP); Ayumi Kochi, Osaka (JP); Kenji Akami, Osaka (JP); Chiharu Hayashi, Osaka (JP); Tomoko Kawashima, Osaka (JP)

(73) Assignee: Panasonic Corporation, Osaka (JP)

( * ) Notice: Subject to any disclaimer, the term of this patent is extended or adjusted under 35 U.S.C. 154(b) by 31 days.

(21) Appl. No.: 11/667,482

(22) PCT Filed: Jan. 6, 2006

(86) PCT No.: PCT/JP2006/000057

§ 371 (c)(1),
(2), (4) Date: May 10, 2007

(87) PCT Pub. No.: WO2006/075551

PCT Pub. Date: Jul. 20, 2006

(65) Prior Publication Data

US 2008/0007893 A1 Jan. 10, 2008

(30) Foreign Application Priority Data

Jan. 11, 2005 (JP) .............................. 2005-003572

(51) Int. Cl.
*H01G 9/02* (2006.01)

(52) U.S. Cl. ..................................... 361/525; 29/25.03
(58) Field of Classification Search ................. 361/525, 361/526–527; 29/25.03
See application file for complete search history.

(56) References Cited

U.S. PATENT DOCUMENTS

| 6,999,303 B2 * | 2/2006 | Hasegawa ................... 361/523 |
| 2005/0073818 A1 * | 4/2005 | Hirano et al. ................ 361/763 |
| 2005/0111165 A1 * | 5/2005 | Merker et al. ............... 361/525 |

FOREIGN PATENT DOCUMENTS

| JP | 5-326338 A | 12/1993 |
| JP | 10-321474 A | 12/1998 |
| JP | 11-67602 A | 3/1999 |
| JP | 2003-158043 A | 5/2003 |
| JP | 2004140051 A * | 5/2004 |

* cited by examiner

*Primary Examiner*—Eric Thomas
(74) *Attorney, Agent, or Firm*—McDermott Will & Emery LLP

(57) ABSTRACT

A solid electrolytic capacitor employing a conductive polymer has a solid electrolyte layer with a laminated structure where a second conductive polymer layer complexed with an ionic polymer is stacked on a first conductive polymer layer composed of polyaniline or a derivative thereof. By achieving a solid electrolyte layer having an excellent self-healing property, a solid electrolytic capacitor having an excellent withstand voltage characteristic can be provided.

8 Claims, 2 Drawing Sheets

SOLID ELECTROLYTIC CAPACITOR AND METHOD FOR MANUFACTURING SAME

RELATED APPLICATIONS

This application is the U.S. National Phase under 35 U.S.C. § 371 of International Application No. PCT/JP2006/300057, filed on Jan. 6, 2006, which in turn claims the benefit of Japanese Application No. 2005-003572, filed on Jan. 11, 2005, the disclosures of which Applications are incorporated by reference herein.

TECHNICAL FIELD

The present invention relates to a solid electrolytic capacitor used in various electronic apparatuses, and its manufacturing method.

BACKGROUND ART

Recently, a solid electrolytic capacitor is often used in a power supply circuit or around a central processing unit (CPU) of a personal computer or the like, and reduction in equivalent series resistance (ESR) is demanded in response to the miniaturization thereof and increase in frequency. One example of electrical characteristics of the solid electrolytic capacitor is a withstand voltage characteristic. The withstand voltage characteristic depends on the thickness of the dielectric film of the solid electrolytic capacitor. When an aluminum solid electrolytic capacitor where the dielectric film is formed by anode oxidation is used, for example, the thickness of the dielectric film is proportional to the voltage of anode oxidation. Therefore, thickness increase of the dielectric film also increases the withstand voltage.

Such a conventional solid electrolytic capacitor basically includes an anode formed of a valve metal having a porous layer, a dielectric film formed on a surface of the porous layer of the valve metal, and a solid electrolyte layer of a conductive polymer formed on the dielectric film. In the conventional solid electrolytic capacitor, as disclosed in Japanese Patent Unexamined Publication No. 2003-158043 for example, a single layer of conductive polymer is used as the solid electrolyte layer.

When a defect occurs in the dielectric film of the conventional solid electrolytic capacitor, leakage current generates heat in the defect part. Generally, a conductive polymer is made insulated by the heat generation caused by the leakage current, but electric short circuit may occur because the withstand voltage of the formed insulator is low. Especially, in an electronic circuit requiring high rated voltage, the short circuit causes a serious problem.

SUMMARY OF THE INVENTION

A solid electrolytic capacitor of the present invention has a solid electrolyte layer having a laminated structure where a second conductive polymer layer complexed with an ionic polymer is stacked on a first conductive polymer layer composed of polyaniline or a derivative thereof.

By achieving a solid electrolyte layer having an excellent self-healing property, a solid electrolytic capacitor having an excellent withstand voltage characteristic can be obtained.

Figure 1:
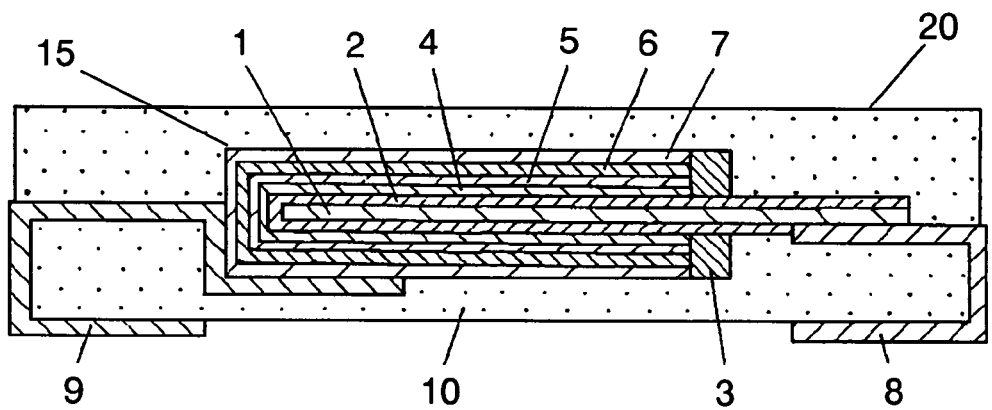
FIG. 1 is a schematic sectional view of a solid electrolytic capacitor in accordance to an exemplary embodiment of the present invention.

REFERENCE MARKS IN THE DRAWINGS 1 valve metal
2 dielectric film
3 insulating section
4 first conductive polymer layer
5 second conductive polymer layer
6 carbon electrode layer
7 silver electrode layer
8 anode
9 cathode
10 molding resin
15 capacitor element
20 solid electrolytic capacitor

DETAILED DESCRIPTION OF PREFERRED EMBODIMENTS

Exemplary Embodiment

A solid electrolytic capacitor of an exemplary embodiment of the present invention and its manufacturing method will be described hereinafter with reference to the accompanying drawings.

In the present exemplary embodiment, capacitor element 15 has valve metal 1, dielectric film 2, insulating section 3, first conductive polymer layer 4, second conductive polymer layer 5, carbon electrode layer 6, silver electrode layer 7, anode 8, and cathode 9. Solid electrolytic capacitor 20 of the present embodiment includes capacitor element 15 with molding resin 10. Each component will be hereinafter described in detail.

Figure 2:
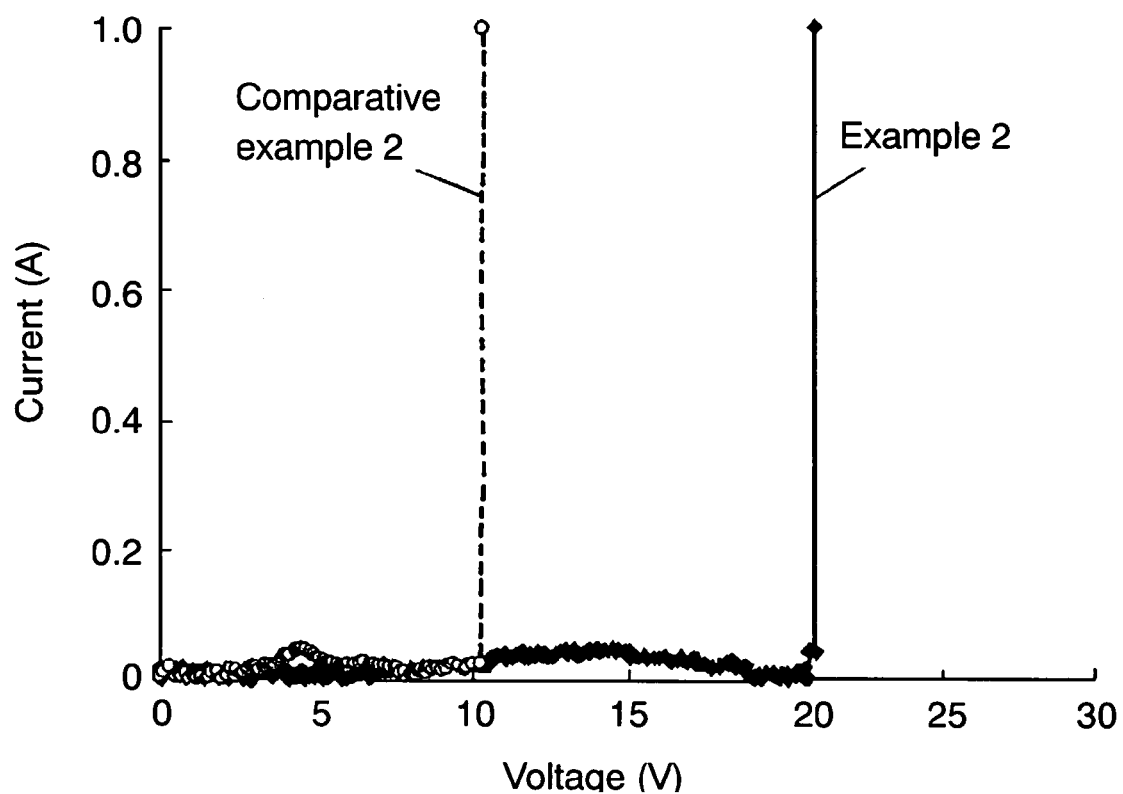
FIG. 2 is a characteristic diagram showing voltage-current characteristics of conductive polymer films in the solid electrolytic capacitor of the present invention.

FIG. 1 is a schematic sectional view of solid electrolytic capacitor 20 in accordance to the exemplary embodiment of the present invention. FIG. 2 is a characteristic diagram showing voltage-current characteristics of conductive polymer films.

Solid electrolytic capacitor 20 has valve metal 1 of tantalum, niobium or aluminum. For increasing the capacitance per unit volume, generally, a porous layer is formed on the surface of valve metal 1 by etching or powder sintering, thereby increasing the surface area thereof. Dielectric film 2 made of an oxide film is formed on the surface of the porous layer of the valve metal.

Insulating section 3 is made of epoxy resin, silicone resin, or polyimide resin. Insulating section 3 electrically separates the anode from the cathode to prevent short circuit between the electrodes.

First conductive polymer layer 4 formed on dielectric film 2 is preferably made of polyaniline or a derivative thereof. The polyaniline is produced by polymerizing aniline. The polyaniline has lower conductivity than polypyrrole or polythiophene, but can be dissolved in a solvent dependently on the kind of dopant. The derivative of polyaniline of the present embodiment is a compound represented by Formula 1, where R or X is replaced with other than hydrogen.

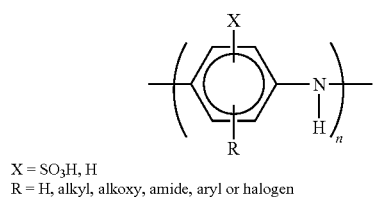

Formula 1

X = SO₃H, H
R = H, alkyl, alkoxy, amide, aryl or halogen

When X is SO$_3$H in Formula 1 and a sulfonic group is contained in the molecule, for example, the derivative is water-soluble polyaniline sulfonic acid. Since the derivative is water-soluble, a film can be easily formed on dielectric film 2. First conductive polymer layer 4 made of polyaniline sulfonic acid is produced as follows: the product-in-process of a capacitor element produced by forming dielectric film 2 and insulating section 3 on the porous layer of valve metal 1 is dipped into aqueous solution of polyaniline sulfonic acid, and is dried. In other words, first conductive polymer layer 4 can be easily produced only by using the aqueous solution of polyaniline or a polyaniline derivative, dipping the product-in-process of the capacitor element into the aqueous solution, and drying it. Additionally, first conductive polymer layer 4 can exhibit an excellent coating property.

A conductive polymer made of aniline or a derivative thereof can be produced by chemical polymerization.

Next, second conductive polymer layer 5 is stacked on first conductive polymer layer 4, thereby producing a solid electrolyte layer. Preferably, second conductive polymer layer 5 is made of a conductive polymer complexed with an ionic polymer.

Here, the ionic polymer means a polymer that comes into an ion state in a solution. This polymer is polyacrylic acid, for example, and has the following property. When the polymer is dissolved in pure water, the polymer is divided into high-charge ions having an extremely high charge and many counter ions having low and opposite charge. An example of the ionic polymer having such a property is a polymer having a carboxyl group, such as polyacrylic acid or polymaleic acid. Especially, polyacrylic acid or polymaleic acid is preferable. Even when an ionic polymer made of the following copolymer is used, similar excellent performance is verified to be exhibited. The copolymer is composed of one of an acrylic acid monomer and a maleic acid monomer and one of polyolefine, polyether, and polyvinyl alcohol.

The conductive polymer complexed with the ionic polymer is considered to have three forms. In the first form, polymer chains of the two polymers are physically entangled. In the second form, the ionic polymer works as a dopant of the conductive polymer and is chemically bonded with the conductive polymer. In the third form, the first form and the second form coexist in the conductive polymer complexed with the ionic polymer.

In the present embodiment, a copolymer of olefine and maleic acid is combined with polypyrrole by an electrolytic polymerization, thereby producing second conductive polymer layer 5. Additionally, pyrrole, thiophene, or derivatives of them can be produced by chemical polymerization or electrolytic polymerization.

Next, carbon electrode layer 6 is formed on second conductive polymer layer 5. Carbon electrode layer 6 can be formed by applying carbon paste. Silver electrode layer 7 is formed on carbon electrode layer 6. Silver electrode layer 7 can be formed by applying silver paste. Carbon electrode layer 6 and silver electrode layer 7 are called a collector layer.

Positive electrode 8 formed by processing a lead frame is coupled to valve metal 1, and negative electrode 9 is coupled to silver electrode layer 7. Thus, capacitor element 15 is completed. On capacitor element 15, sheath 10 is formed by molding epoxy resin or the like. At this time, a part of each of anode 8 and cathode 9 is exposed at each end of molding resin 10 and used as an external electrode.

The solid electrolytic capacitor having a solid electrolyte layer formed of two conductive polymer layers has high withstand voltage characteristic. First conductive polymer layer 4 is required for forming second conductive polymer layer 5, and second conductive polymer layer 5 is stacked on it to form a conductive film with a high withstand voltage property. Therefore, the withstand voltage characteristic of the solid electrolytic capacitor can be improved.

Figure 3:
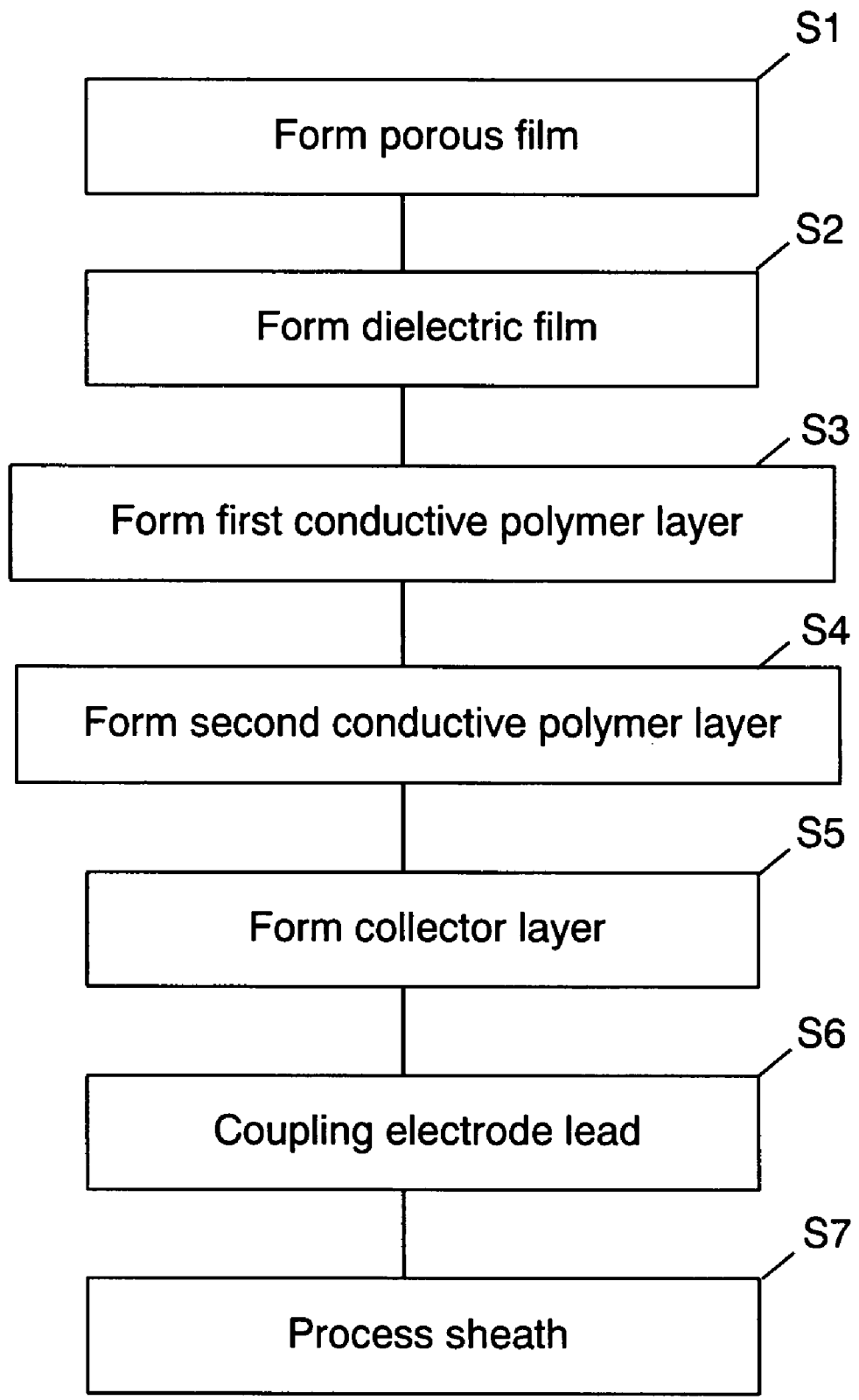
FIG. 3 is a flowchart illustrating manufacturing steps of the solid electrolytic capacitor of the present invention.

A manufacturing method of the solid electrolytic capacitor of the present embodiment is described with reference to FIG. 3. In the present embodiment, aluminum foil is used as valve metal 1, polyaniline sulfonic acid is used as first conductive polymer layer 4, and polypyrrole complexed with a copolymer of olefine and maleic acid is used as second conductive polymer layer 5.

(First step) The first step is step S1 of forming a porous film.

Aluminum foil (hereinafter referred to as "aluminum foil 1") with a thickness of 100 μm is prepared as valve metal 1. Aluminum foil 1 is die-cut into a predetermined element shape, and etched except for the part defining the anode, thereby forming a porous layer on both faces of aluminum foil 1.

(Second step) The second step is step S2 of forming dielectric film 2.

Aluminum foil 1 is dipped in an ammonium dihydrogen phosphate aqueous solution, and anode oxidation is performed at an applied voltage of 5V. Thus, dielectric film 2 is formed on the surface of the porous layer of aluminum foil 1. Next, insulating section 3 is formed by sticking insulating tape made of polyimide to a predetermined position of aluminum foil 1. Insulating section 3 may be formed using silicon resin or epoxy resin.

(Third step) The third step is a step of forming a solid electrolyte layer, and includes step S3 of forming first conductive polymer layer 4, and step S4 of forming second conductive polymer layer 5.

In step S3, aluminum foil 1 having dielectric film 2 is dipped in a polyaniline sulfonic acid aqueous solution, and then is dried, thereby forming first conductive polymer layer 4 made of polyaniline sulfonic acid.

In step S4, second conductive polymer layer 5 made of polypyrrole complexed with an ionic polymer is formed using the electrolytic polymerization. A copolymer of olefine and maleic acid is used as the ionic polymer. A solid electrolyte layer having a two-layer structure is thus formed. This electrolytic polymerization employs a solution that is produced by dissolving 1.6 g of alkyl naphthalene sulfonic acid sodium salt in 98 ml of water, adding the copolymer of olefine and maleic acid to the solution so that the solid ratio of the copolymer to the solution is 1%, and mixing and dissolving 1.6 g of ethanol and 2.68 g of pyrrole.

(Fourth step) The fourth step is step S5 of forming a collector layer.

The collector layer of the present embodiment has a laminated structure of carbon electrode layer 6 and silver electrode layer 7.

Carbon paste is applied onto second conductive polymer layer 5 that is produced by the electrolytic polymerization to form carbon electrode layer 6. Silver paste is applied onto carbon electrode layer 6 to form silver electrode layer 7.

(Fifth step) The fifth step includes step S6 of coupling an electrode lead and step S7 of forming the molding resin and the external electrode.

In step S6, lead frames processed in predetermined shapes are coupled to valve metal 1 and silver electrode layer 7 using a welding method or the like, respectively. Anode 8 is coupled to valve metal 1, and cathode 9 is coupled to silver electrode layer 7. Thus, capacitor element 15 is produced. Subsequently, in step S7, molding resin 10 is formed by molding whole capacitor element 15 using epoxy resin or the like. Then, anode 8 and cathode 9 exposed on the surface of molding resin 10 are plated with nickel and solder to form external electrodes, thereby producing solid electrolytic capacitor 20.

In the present embodiment, the effective area per capacitor element where the capacity of the capacitor element is exploited is 4 mm×3 mm.

Finally, solid electrolytic capacitor 20 is aged, thereby providing a sample for evaluation of the solid electrolytic capacitor of example 1.

Next, comparative example 1 is described hereinafter.

A polypyrrole solution is previously produced by dissolving 1.6 g of alkyl naphthalene sulfonic acid sodium salt in 98 ml of water, and then adding 1.6 g of ethanol and 2.68 g of pyrrole to it. A first conductive polymer layer is then formed similarly to example 1, and then a second conductive polymer layer is formed on the first conductive polymer layer by electrolytic polymerization using the previously produced polypyrrole solution. At this time, in comparative example 1, the polypyrrole solution during electrolytic polymerization contains no ionic polymer (for example, copolymer of olefine and maleic acid), differently from the embodiment of the present invention. The solid electrolyte layer of comparative example 1 includes the first conductive polymer layer and second conductive polymer layer. In this second conductive polymer layer, however, polypyrrole is not complexed with an ionic polymer, differently from example 1. Then, a solid electrolytic capacitor is produced by a manufacturing method similar to that of example 1.

Electrical characteristics of the solid electrolytic capacitors of example 1 and comparative example 1 are shown in Table 1.

The withstand voltage characteristic is measured using an ammeter and a direct-current power supply allowing voltage control. In this measuring method, the voltage is increased from 0 V to 100 V by 0.2 V per second, and the voltage value is measured at the point of time when a current of 1 A flows. The measured value is set as the withstand voltage characteristic of this sample.

The result in Table 1 shows that the solid electrolytic capacitor of example 1 has a higher withstand voltage property than that of comparative example 1.

TABLE 1

|  | Capacitance (µF) | ESR (mΩ) | Withstand voltage (V) |
| --- | --- | --- | --- |
| Example 1 | 32 | 14 | 13.2 |
| Comparative example 1 | 32 | 13 | 7.6 |

Polyaniline sulfonic acid is used as first conductive polymer layer 4 in the present embodiment; however, another derivative of polyaniline may be used as first conductive polymer layer 4.

Alkyl naphthalene sulfonic acid sodium salt is used as a dopant to polypyrrole that forms second conductive polymer layer 5 in the present embodiment; however, aromatic sulfonic acid and a derivative thereof may be used.

The number of sulfonic groups included in the dopant is not limited to one. Disulfonic acid containing two sulfonic groups and a derivative thereof, trisulfonic acid containing three sulfonic groups and a derivative thereof, and tetrasulfonic acid containing four sulfonic groups and a derivative thereof can also exhibit similar performance.

Using a compound containing a plurality of sulfonic groups as the dopant improves the reliability of the solid electrolytic capacitor against stress and the heat resistance thereof.

A substituent group except sulfonic group may exist on an aromatic ring. Since a sterically bulky substituent group exists, dedoping is suppressed, and hence the heat resistance of the solid electrolytic capacitor can be expected to improve. Further, when a substituent group capable of bonding with hydrogen exists, the heat resistance can be further improved.

The substituent group may have a reactive part such as a double bond group or an epoxy group. In this case, a solid electrolytic capacitor of higher reliability can be achieved by making reactive parts react with each other or by employing a conductive polymer where the reactive parts are cross-linked using another compound.

A copolymer of olefine and maleic acid is used as the ionic polymer in the present embodiment; however, another ionic polymer may be used. Polyacrylic acid or polymaleic acid may be used as an ionic polymer capable of achieving such a characteristic. Even when a copolymer produced as follows is used as the ionic polymer, a similar advantage can be achieved. The copolymer is produced by copolymerizing one of monomers of acrylic acid and maleic acid with one of monomers of olefine, vinyl ether, and vinyl alcohol. This copolymer includes a block copolymer.

Even when the conductive polymer complexed with the ionic polymer is mainly made of polypyrrole and a derivative thereof, a similar advantage can be achieved.

Pyrrole is used as the monomer of the conductive polymer; however, a pyrrole derivative, thiophene, or a thiophene derivative may be used. These compounds allow obtaining of characteristics such as high conductivity, high heat resistance, high mechanical strength, and solubility. When such a conductive polymer is used as second conductive polymer layer 5, low ESR and high heat resistance can be achieved, in addition to the withstand voltage characteristic as an important characteristic of the solid electrolytic capacitor.

In the present embodiment, second conductive polymer layer 5 is produced by electrolytic polymerization. Instead of this method, second conductive polymer layer 5 may be produced by chemical polymerization or combined use of chemical polymerization and electrolytic polymerization. In the chemical polymerization, various compounds are easily mixed into a reaction system, and second conductive polymer layer 5 having various characteristics can be easily produced. In the electrolytic polymerization, reactions continuously occur on the surface of the electrode, and dense second conductive polymer layer 5 of high conductivity can be obtained, so that the ESR is lower than that of the layer produced by chemical polymerization.

The conductive polymer used in the present invention is described hereinafter in more detail.

Generally, a conductive polymer used in a solid electrolytic capacitor is produced by chemically or electrolytically polymerizing pyrrole, thiophene, or derivatives of them.

The chemical polymerization means the method of polymerizing by oxidation reaction using an oxidizer. The electrolytic polymerization means the polymerizing method using an electrochemical reaction. These producing methods are used not only for producing a conductive polymer in a capacitor element but also for synthesizing and evaluating the conductive polymer.

Reactions occur everywhere in the solution during the chemical polymerization, so that it is difficult to obtain a conductive polymer film for evaluation.

During the electrolytic polymerization, reactions occur only on the electrode in the solution. Therefore, a conductive polymer film is produced on the electrode, so that the evaluation is easily performed using the produced conductive polymer film. In the present embodiment, the conductive polymer film is produced by electrolytic polymerization, and is evaluated.

For producing the conductive polymer to be used for second conductive polymer layer 5 of the present invention, the conductive polymer is required to be complexed with an ionic polymer. When pyrrole as a main component of the conductive polymer is polymerized into polypyrrole as the conductive polymer, a complex can be achieved by complexing it with the ionic polymer in the solution.

Followings are the forming types of the complex: the ionic polymer as a dopant is chemically bonded with the conductive polymer in the first form; (2) polymer chains of the two polymers are physically entangled in the second form; and (3) the first form and the second form coexist in the complex in the third form.

Generally, when current is loaded through the conductive polymer, dedoping is caused by heat generation, and the conductive polymer is insulated by oxidation. A solid electrolytic capacitor employing a conventional conductive polymer as solid electrolyte has not so high withstand voltage characteristic.

It is found that the withstand voltage of the insulating film can be increased by employing a laminated structure where a conductive polymer complexed with an ionic polymer is stacked on a conductive polymer made of polyaniline or a derivative thereof. When these conductive polymers are used as the solid electrolyte layer of the solid electrolytic capacitor, the withstand voltage can be increased without reducing the ESR characteristic of the solid electrolytic capacitor.

Since the ionic polymer can also work as a dopant of the conductive polymer, the ionic polymer is easily complexed with a conductive polymer chain. In the electrolytic polymerization, the ionic polymer is attracted to the proximity of the electrode due to its charge, so that the complexing with the conductive polymer proceeds more easily.

Since the ionic polymer contains at least one monomer of olefine, vinyl ether, and vinyl alcohol as a copolymer component, adherence of the conductive polymer film increases and the withstand voltage of the insulator made of the conductive polymer further increases. The withstand voltage of the solid electrolytic capacitor employing the conductive polymer can be further increased.

Next, the producing method of a conductive polymer film of the solid electrolytic capacitor of the present invention is described.

A container is firstly prepared, and 1.6 g of alkyl naphthalene sulfonic acid sodium salt is dissolved in 98 ml of water in this container.

The copolymer of olefine and maleic acid is added to the solution so that the solid ratio of the copolymer to the solution is 1%, then 1.6 g of ethanol and 2.68 g of pyrrole are mixed, thereby producing a sample of example 2.

Alkyl naphthalene sulfonic acid sodium salt works as a dopant of the conductive polymer, and charges are transferred between the conductive polymer and the dopant to generate conductivity. Sodium salt of alkyl naphthalenesulfonic acid is used in the present embodiment: however, alkyl naphthalene sulfonic acid may be used by itself. Instead of sodium alkyl naphthalene sulfonate, aromatic sulfonic acid, aliphatic sulfonic acid, or derivatives of them may be used. An example of the aromatic series used for the aromatic sulfonic acid may be a compound having a structure of benzene, naphthalene, anthracene, pyrene, biphenyl, terphenyl, furan, pyrrole, thiophene, or pyridine. In addition to these compounds, an aromatic compound containing $\pi$ electrons complying with Huckel's $(4n+2)$ $\pi$ rule may be used.

The number of sulfonic groups as a dopant is not limited to be one. Disulfonic acid containing two sulfonic groups and a derivative thereof, trisulfonic acid containing three sulfonic groups and a derivative thereof, or tetrasulfonic acid containing four sulfonic groups and a derivative thereof may be used. When a compound containing a plurality of sulfonic groups is used as the dopant, the conductive polymer chains are cross-linked to each other, and the mechanical strength increases. A plurality of parts are doped, so that dedoping hardly occurs, and the heat resistance also improves.

A substituent group except the sulfonic group may exist on an aromatic ring. Since a sterically bulky substituent group exists, dedoping is suppressed, and hence the heat resistance can be expected to improve. When a substituent group capable of hydrogen-bonding exists—even if the substituent group is not sterically bulky—, dedoping can be suppressed by hydrogen bonding. When the substituent group have a reactive part such as a double bond part or an epoxy group, the strength of the conductive polymer film can be increased by making reactive parts react with each other or by cross-linking the reactive parts to each other using another compound.

Pyrrole is used as the monomer of the conductive polymer in the present embodiment; however, a pyrrole derivative, thiophene, or a thiophene derivative may be used. These compounds allow obtaining of characteristics such as high conductivity, high heat resistance, high mechanical strength, and solubility. Ethanol is added in order to improve the solubility of pyrrole.

Then, two nickel plates are installed as electrodes in the aqueous solution so that they do not come into contact with each other, and a voltage of 3.0 V is applied between the nickel plates for 30 minutes to cause the electrolytic polymerization, and a conductive polymer film is produced on the nickel plate on the anode.

The nickel plate on the anode is then rinsed and dried, and then the conductive polymer film is peeled from the nickel plate and is used as a sample for measurement.

At this time, it is ensured that two nickel plates are not brought into contact with each other. The nickel surface of the 30 $\mu$m-thick and 7.5 mm-wide nickel plate is exposed longitudinally by 70 mm. When the other part is insulated by taping up, a conductive polymer is produced only on the exposed part of the nickel.

A voltage of 3.0 V is applied for electrolytic polymerization in the present embodiment; however, the other voltage may be applied. When the voltage is too high, the electrolysis of water as a side reaction strongly occurs, thereby making it difficult to produce a homogeneous conductive polymer film.

When the voltage is too low, electrolytic polymerization does not occur. It is preferable that the applied voltage is set between 1 V and about 5 V, depending on which device is used. The actual reaction depends on not voltage but potential. Therefore, accurately, it is preferable to control the reaction using the potential of the electrode during observation.

If the control is performed using the potential in the present embodiment, the potential of the anode is preferably set between 0.6 V and 2 V when a silver-silver chloride electrode is used as a reference electrode.

The voltage is controlled in the present embodiment; however, a current control method may be used. When the current control method is used to perform the electrolytic polymerization, the number of generated moles of the conductive polymer is easily made constant, and a very homogeneous conductive polymer film can be produced.

The electrolytic polymerization is performed at room temperature in the present embodiment; however, the electrolytic polymerization may be performed at a lower temperature or a higher temperature. At the lower temperature, the volatilization of the solution is advantageously controlled, and the life of the solution can be extended. When the temperature is not higher than the melting point of the solution, however, the solution freezes and the reaction becomes unstable or does not occur. At the higher temperature, the volatilization of the solution is promoted but the reaction can be speeded up. When water is used as the solvent as shown in the present embodiment, the temperature range from 0° C. to 50° C. is preferable. When tetrahydrofuran or the like used for organic synthesis or the like is used as the solvent, the temperature may be decreased to about −100° C.

It is preferable to sufficiently perform the rinse after the electrolytic polymerization. When the rinse is insufficient, solute such as an un-reacted monomer or dopant can adhere to and remain on the produced conductive polymer film. The adhering matter pollutes the surface, so that the measurement of the conductivity can be affected adversely or degradation of the conductive polymer can be promoted.

The drying needs to be performed in a temperature range in which decomposition or dedoping of the conductive polymer does not occur. The drying is preferably performed at as low a temperature as possible, but the temperature range from room temperature to 200° C. is preferable in consideration of productivity in producing the solid electrolytic capacitor.

Next, comparative examples 2 and 3 are described hereinafter.

Firstly, 1.6 g of alkyl naphthalene sulfonic acid sodium salt is dissolved in 98 ml of water, and 1.6 g of ethanol and 2.68 g of pyrrole are mixed and dissolved in the water. Two nickel plates are installed as electrodes in the produced aqueous solution so that they do not come into contact with each other, and a voltage of 3.0 V is applied between the nickel plates for 30 minutes. The nickel plate on the anode is rinsed and dried, and then the conductive polymer film is peeled from the nickel plate to provide a sample for measurement.

The solid electrolyte layer of comparative example 2 produced above includes only second conductive polymer layer 5, and second conductive polymer layer 5 is not complexed with an ionic polymer. While, comparative example 3 has a solid electrolyte layer with a two-layer structure, but second conductive polymer layer 5 is not complexed with an ionic polymer.

Regarding the conductive polymer produced by the above-mentioned method, the conductivity is measured by a four-point probe method using Loresta GP of Dia Instruments Co., Ltd.

The withstand voltage is measured using an ammeter and a direct-current power supply allowing voltage control. The voltage is increased from 0 V to 100 V by 0.2 V per second, the withstand voltage at the point of time when a current of 1 A flows is set as the withstand voltage characteristic of this sample.

In comparative example 2, a silver plate is used as a metal plate used for measuring the withstand voltage of the conductive polymer. Example 2 and comparative example 3 have the following laminated structure. Polyaniline sulfonic acid is produced on the surface of the metal plate used for measuring the withstand voltage, thereby forming first conductive polymer layer 4. A conductive polymer as second conductive polymer layer 5 is formed on first conductive polymer layer 4. The advantage of the lamination of two layers is verified.

Table 2 shows the measurement result of the voltage-current characteristics of these conductive polymers.

According to the result shown in Table 2, the withstand voltage characteristic of example 2 is higher than those of comparative examples 2 and 3. Here, example 2 has the laminated structure of the conductive polymer made of polyaniline and the conductive polymer complexed with the ionic polymer.

TABLE 2

| | Withstand voltage (V) | Coating metal plate for withstand voltage measurement with polyaniline sulfonic acid |
|---|---|---|
| Example 2 | 20.2 | Presence |
| Comparative example 2 | 9.6 | Absence |
| Comparative example 3 | 11.7 | Presence |

The conductivity of example 2 is 10 to 20 S/cm (siemens per centimeter), and is practical enough for the conductive polymer used for the solid electrolyte layer.

Next, FIG. 2 shows a characteristic diagram of the voltage-current characteristics of the conductive polymer films.

According to the result shown in FIG. 2, example 2 of the present invention has a higher withstand voltage characteristic than comparative example 2. A breakage mechanism of the conductive polymer film of example 2 is considered as follows: when excessive current is applied, the excessive current flows through the conductive polymer film to generate heat, and dedoping occurs in the conductive polymer film to cause insulation. When the voltage is further increased, a short circuit occurs. The voltage at which the short circuit occurs is called a withstand voltage. In example 2, both the voltage causing the insulation and the voltage causing the short circuit are high, and a conductive polymer film having a high withstand voltage characteristic is formed.

A copolymer of olefine and maleic acid is used as the ionic polymer in the present embodiment; however, a single polymer of maleic acid or acrylic acid may be used. A copolymer of maleic acid or acrylic acid and one monomer of the following materials may be used: such monomer as butadiene, isoprene, isobutylene, or monomers of polystyrene, polyacrylonitrile, polyurethane, polyvinyl alcohol, polyvinyl acetate, polymethylacrylate, and polymethyl methacrylate. Instead of these monomers, derivatives of them may be used. The copolymer may contain a block copolymer.

A complex where one of the single polymer and the copolymer is mixed with one of the following polymers may be used as the ionic polymer. Here, the polymers are polyoxymethylene, polyoxyethylene, polyoxypropylene, polyester, polycarbonate, polyethersulfone, polyamide, polyimide, polyvinylidene-fluoride, polytetrafluoro-ethylene, cellulose, polysiloxane, polyacrylic acid, polymaleic acid, and polyacetal.

INDUSTRIAL APPLICABILITY

A solid electrolytic capacitor of the present invention has a solid electrolyte layer. The solid electrolyte layer includes polyaniline or a derivative thereof and a conductive polymer complexed with an ionic polymer. The solid electrolytic capacitor has an excellent withstand voltage characteristic, and is useful in a power supply circuit used for various electronic apparatuses.

The invention claimed is:

1. A solid electrolytic capacitor comprising a capacitor element having a sheath,
the capacitor element including:
a valve metal having a porous layer;
a dielectric film formed on a surface of the porous layer;
a solid electrolyte layer formed on the dielectric film;
a collector layer formed on the solid electrolyte layer; and
external electrodes coupled to the valve metal and the collector layer, respectively,
the solid electrolyte layer including:
a first conductive polymer layer that is formed on the dielectric film and made of a conductive polymer containing a derivative of polyaniline; and
a second conductive polymer layer that is formed on the first conductive polymer layer and made of a conductive polymer complexed with an ionic polymer, the ionic polymer made from maleic acid,
wherein the derivative of polyaniline is a conductive polymer represented by a following formula,

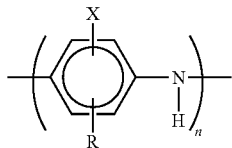

$X = SO_3H$
R = H, alkyl, alkoxy, amide, aryl or halogen.

2. The solid electrolytic capacitor of claim 1, wherein the ionic polymer is polymaleic acid.

3. The solid electrolytic capacitor of claim 1, wherein the ionic polymer is a copolymer of maleic acid and at least one monomer selected from olefine, vinyl ether, and vinyl alcohol.

4. The solid electrolytic capacitor of claim 1, wherein the second conductive polymer layer is a conductive polymer layer formed by one of chemical polymerization, electrolytic polymerization, and combined use of the chemical polymerization and the electrolytic polymerization.

5. A manufacturing method of a solid electrolytic capacitor comprising:
forming a dielectric film on a surface of a valve metal having a porous layer;
forming a first conductive polymer layer on a surface of the dielectric film, the first conductive polymer layer being made of a conductive polymer containing a derivative of polyaniline;
forming a second conductive polymer layer on the first conductive polymer layer, the second conductive polymer layer being made of a conductive polymer complexed with an ionic polymer, the ionic polymer made from maleic acid;
forming a collector layer on a surface of the second conductive polymer layer; and
coupling external electrodes to the valve metal and the collector layer, respectively, wherein the derivative of polyaniline is a conductive polymer represented by a following formula,

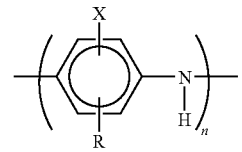

$X = SO_3H$
R = H, alkyl, alkoxy, amide, aryl or halogen.

6. The manufacturing method of the solid electrolytic capacitor of claim 5, wherein
the step of forming the second conductive polymer layer is a step of forming a conductive polymer layer by chemical polymerization.

7. The manufacturing method of the solid electrolytic capacitor of claim 5, wherein
the step of forming the second conductive polymer layer is a step of forming a conductive polymer layer by electrolytic polymerization.

8. The manufacturing method of the solid electrolytic capacitor of claim 5, wherein
the step of forming the second conductive polymer layer is a step of forming a conductive polymer layer by combined use of chemical polymerization and electrolytic polymerization.

* * * * *